United States Patent
Joshi et al.

(10) Patent No.: US 12,344,316 B2
(45) Date of Patent: Jul. 1, 2025

(54) ROOF OF AN OPERATOR COMPARTMENT FOR A VEHICLE

(71) Applicant: DEERE & COMPANY, Moline, IL (US)

(72) Inventors: Shrikant Joshi, Pune (IN); Pandharinath N. More, Pune (IN); Ganesh Mali, Pune (IN); Jesse R. Neely, Annawan, IL (US)

(73) Assignee: Deere & Company, Moline, IL (US)

( * ) Notice: Subject to any disclaimer, the term of this patent is extended or adjusted under 35 U.S.C. 154(b) by 293 days.

(21) Appl. No.: 18/155,164

(22) Filed: Jan. 17, 2023

(65) Prior Publication Data
US 2024/0239414 A1    Jul. 18, 2024

(51) Int. Cl.
*B62D 25/07* (2006.01)
*B62D 25/06* (2006.01)
*B62D 33/06* (2006.01)

(52) U.S. Cl.
CPC ............ *B62D 25/07* (2013.01); *B62D 25/06* (2013.01); *B62D 33/06* (2013.01)

(58) Field of Classification Search
CPC ......... B62D 25/06; B62D 25/07; B62D 33/06
USPC .................. 296/190.01, 9, 210, 213, 193.12
See application file for complete search history.

(56) References Cited

U.S. PATENT DOCUMENTS

| | | | |
|---|---|---|---|
| 5,950,366 A | 9/1999 | Uhlmeyer | |
| 7,530,623 B2 | 5/2009 | Hampel | |
| 8,668,255 B1 * | 3/2014 | Randleman | B62D 33/06 296/213 |
| 10,399,417 B2 * | 9/2019 | Peterson | B60R 21/13 |
| 11,556,132 B2 * | 1/2023 | Nishi | A01B 69/008 |
| 12,084,116 B2 * | 9/2024 | Booth | B62D 25/07 |

FOREIGN PATENT DOCUMENTS

| | | | |
|---|---|---|---|
| EP | 1147971 B1 | 6/2005 | |
| JP | 6669678 B2 | 3/2020 | |
| KR | 19980026147 U * | 8/1998 | ............ B62D 25/07 |

OTHER PUBLICATIONS

KR19980026147 Text (Year: 1998).*

* cited by examiner

*Primary Examiner* — Dennis H Pedder
(74) *Attorney, Agent, or Firm* — Taft Stettinius & Hollister LLP; Stephen F. Rost (57) ABSTRACT

A roof of a vehicle, such as an agricultural vehicle, may include a first roof panel and a second roof panel. The first roof panel and the second roof panel may be connected along an interface the defines a passageway. The first roof panel and the second roof panel may define a path extending generally longitudinally along the roof with the first roof panel and the second roof panel sloping away from the path toward a first lateral side of the roof and a second lateral side of the roof. The passageway may extend laterally from the first lateral side to the second lateral side.

20 Claims, 7 Drawing Sheets

ROOF OF AN OPERATOR COMPARTMENT FOR A VEHICLE

FIELD OF THE DISCLOSURE

The present disclosure relates generally to roofs for vehicles, such as a work vehicle, and, particularly, to roofs for an operator compartment of a vehicle.

BACKGROUND OF THE DISCLOSURE

Work vehicles, such as agricultural work vehicles, include combine harvesters and tractors. Many such work vehicles include an operator compartment, also referred to as a cabin or cab (referred to hereinafter as "cab"). An operator of the work vehicle resides in the cab and controls the operation of the work vehicle therefrom.

SUMMARY OF THE DISCLOSURE

A first aspect of the present disclosure is directed to a roof for an agricultural vehicle. The roof may include a first roof panel forming a leading roof portion and a second roof panel forming a trailing roof portion and connected to the first roof panel at an interface. The first roof panel and the second roof panel may define a path extending generally longitudinally along the first roof panel and the second roof panel with the first roof panel and the second roof panel sloping away from the path towards a first lateral side and a second lateral side of the roof. The interface may define a passageway extending laterally between the first lateral side and the lateral second side.

Another aspect of the present disclosure is directed to an agricultural machine that includes a cab that includes a roof. The roof may include a first roof panel forming a leading roof portion and a second roof panel forming a trailing roof portion and connected to the first roof panel at an interface. The first roof panel and the second roof panel may define a path extending generally longitudinally along the first roof panel and the second roof panel with the first roof panel and the second roof panel sloping away from the path towards a first lateral side and a second lateral side of the roof. The interface may define a passageway extending laterally between the first lateral side and the lateral second side.

The various aspects of the present disclosure may include one or more of the following features. The passageway may include an outlet may be disposed at a position along at least one of the first lateral side and the second lateral side. The first roof panel may include a first raised portion formed at a trailing end portion of the first roof panel. The second roof panel may include a first recess formed at a leading end portion of the second roof panel and a second raised portion formed adjacent to the first recess. The trailing end portion of the first roof panel may overlap the leading end portion of the second roof panel such that the second raised portion of the second roof panel nests within the first raised portion formed in the first roof panel. The first raised portion, the second raised portion, and the first recess may extend along an entirety of the interface. The first roof panel may include an exterior surface adjacent to the second roof panel, and the passageway may be defined between the first recess of the second roof panel and a portion of the exterior surface of the first roof panel adjacent to the first recess. A cross-sectional size of the passageway may vary along the interface. The leading end portion of the second roof panel may include a leading edge, and a seal may be formed along the leading edge between the leading edge and an exterior surface of the first roof panel adjacent to the second roof panel. The trailing end portion of the first roof panel may include a trailing edge, and a seal is formed along the trailing edge between the trailing edge and an exterior surface of the second roof panel adjacent to the first roof panel. The seal may include a bulb seal. A wall formed at an end of the leading end portion of the second roof panel may extend approximately perpendicularly to an exterior surface of the first roof panel. A wall formed at an end of the trailing end portion of the first roof panel may extend perpendicularly to an exterior surface of the second roof panel.

Further, one or more of the various aspects may include one or more of the following features. The passageway may include an outlet disposed at a position along the first lateral side or the second lateral side. The first roof panel may include a first raised portion formed at a trailing end portion of the first roof panel. The second roof panel may include a first recess formed at a leading end portion of the second roof panel and a second raised portion formed adjacent to the first recess. The trailing end portion of the first roof panel may overlap the leading end of the second roof panel such that the second raised portion of the second roof panel nests within the first raised portion formed in the first roof panel. The first roof panel may include an exterior surface adjacent to the second roof panel, and the passageway may be defined between the first recess of the second roof panel and a portion of the exterior surface of the first roof panel adjacent to the first recess. The leading end portion of the second roof panel may include a leading edge, and a seal may be formed along the leading edge between the leading edge and an exterior surface of the first roof panel adjacent to the second roof panel. The trailing end portion of the first roof panel may include a trailing edge, and a seal may be formed along the trailing edge between the trailing edge and an exterior surface of the second roof panel adjacent to the first roof panel. The roof may also include a first outlet is formed at the first lateral side and a second outlet formed at the second lateral side. The passageway may extend from the first outlet to the second outlet.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

Words of orientation, such as "up," "down," "top," "bottom," "above," "below," "leading," "trailing," "front," "back," "forward," and "rearward," are used in the context of the illustrated examples as would be understood by one skilled in the art and are not intended to be limiting to the disclosure. For example, for a particular type of vehicle or implement in a conventional configuration and orientation, one skilled in the art would understand these terms as the terms apply to the particular vehicle or implement.

For example, as used herein, with respect to a work vehicle (e.g., a combine harvester), unless otherwise defined or limited, the term "forward" (and the like) corresponds to a forward direction of travel of the work vehicle over the ground during normal operation of the work vehicle. Likewise, the term "rearward" (and the like) corresponds to a direction opposite the forward direction of travel of the work vehicle.

Also as used herein, with respect to a vehicle or components thereof, unless otherwise defined or limited, the term "leading" (and the like) indicates a direction of travel of the vehicle during normal operation (e.g., the forward direction of travel of a work vehicle). Similarly, the term "trailing" (and the like) indicates a direction that is opposite the leading direction.

The present disclosure is directed to roofs of a cab of a work vehicles, such as agricultural work vehicles including combine harvesters or tractors. The roofs within the scope of the present disclosure provide for improved water intrusion prevention. For example, the roofs described herein are constructed so as to form a passageway that conducts a liquid, such as water, that is able to intrude into the passageway to one or more outlets while preventing or reducing introduction of the liquid into the cab of the work vehicle. Additionally, the roof includes seals that function to prevent liquid from passing between panels of the roof. For example, a first seal is formed at an interface between a first roof panel and a second roof panel and operates to prevent the water or other liquid from passing beyond the first seal. In some implementations, the interface forms a lap joint between the first roof panel and the second roof panel. Any water or other liquid that does intrude beyond the first seal is captured by the passageway formed between the first and second roof panels, and the passageway conducts the liquid to one or more outlets where the liquid is expelled from the passageway. In this way, the water penetrating beyond the first seal is passed out of the passageway without penetrating into an interior compartment of the cab. In some instances, a second seal formed between the first and second roof panels provides additional protection to prevent water or another liquid present within the passageway from passing into the interior compartment of the cab.

Figure 1:
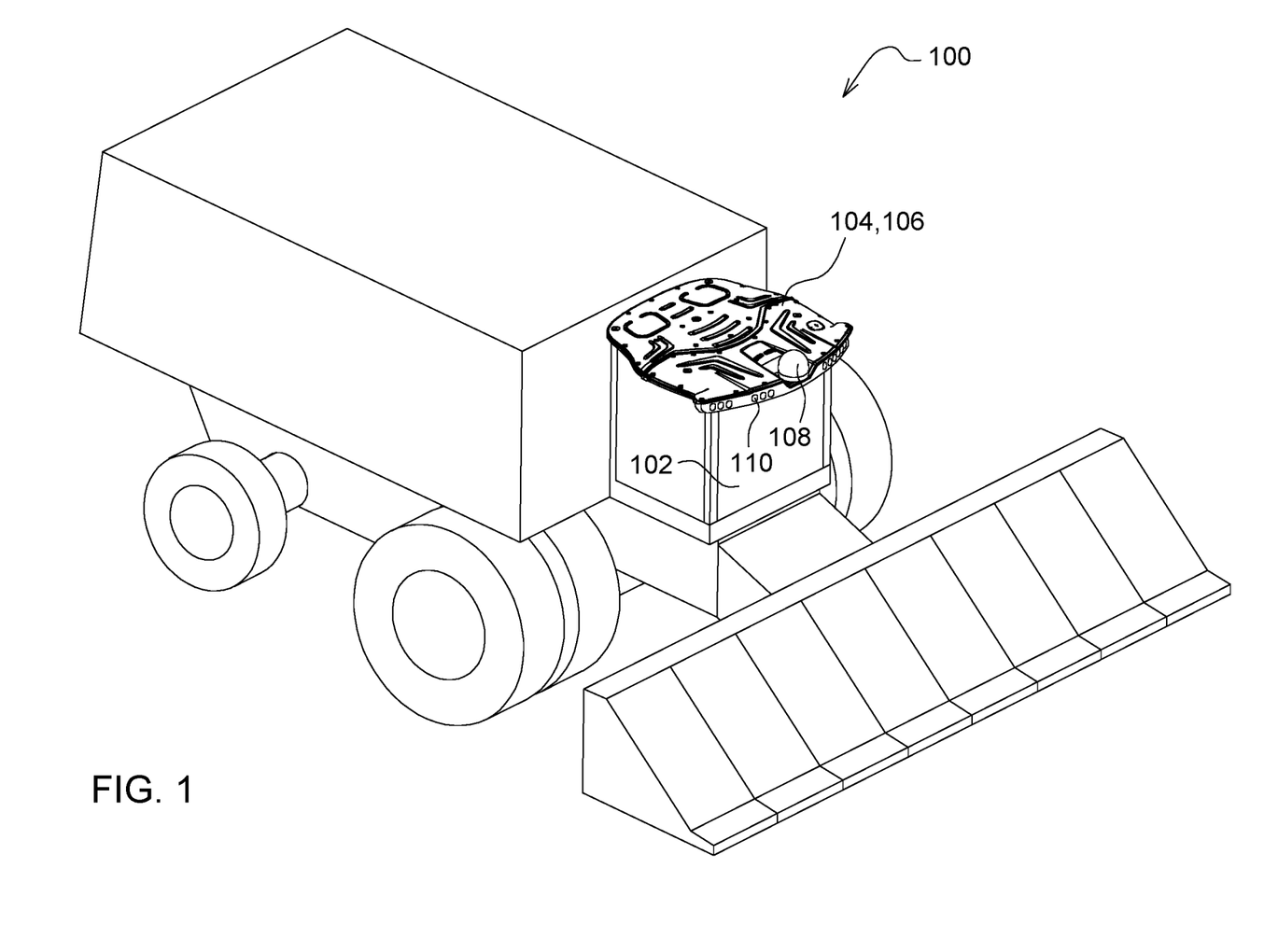
FIG. 1 is a perspective view of an example work vehicle.

FIG. 1 is a perspective view of an example work vehicle 100. In the illustrated example, the work vehicle 100 is a combine harvester that includes a cab 102. The cab 102 includes a roof 104 located at a top 106 of the cab 102. In the illustrated example, the roof 104 provides for protection of the operator located inside the cab from the environment. The roof 104 may also serve as a mounting platform, such as to mount antennas, (e.g., a global navigation satellite system (GNSS) antenna 108) and lights, such as work lights 110.

Figure 2:
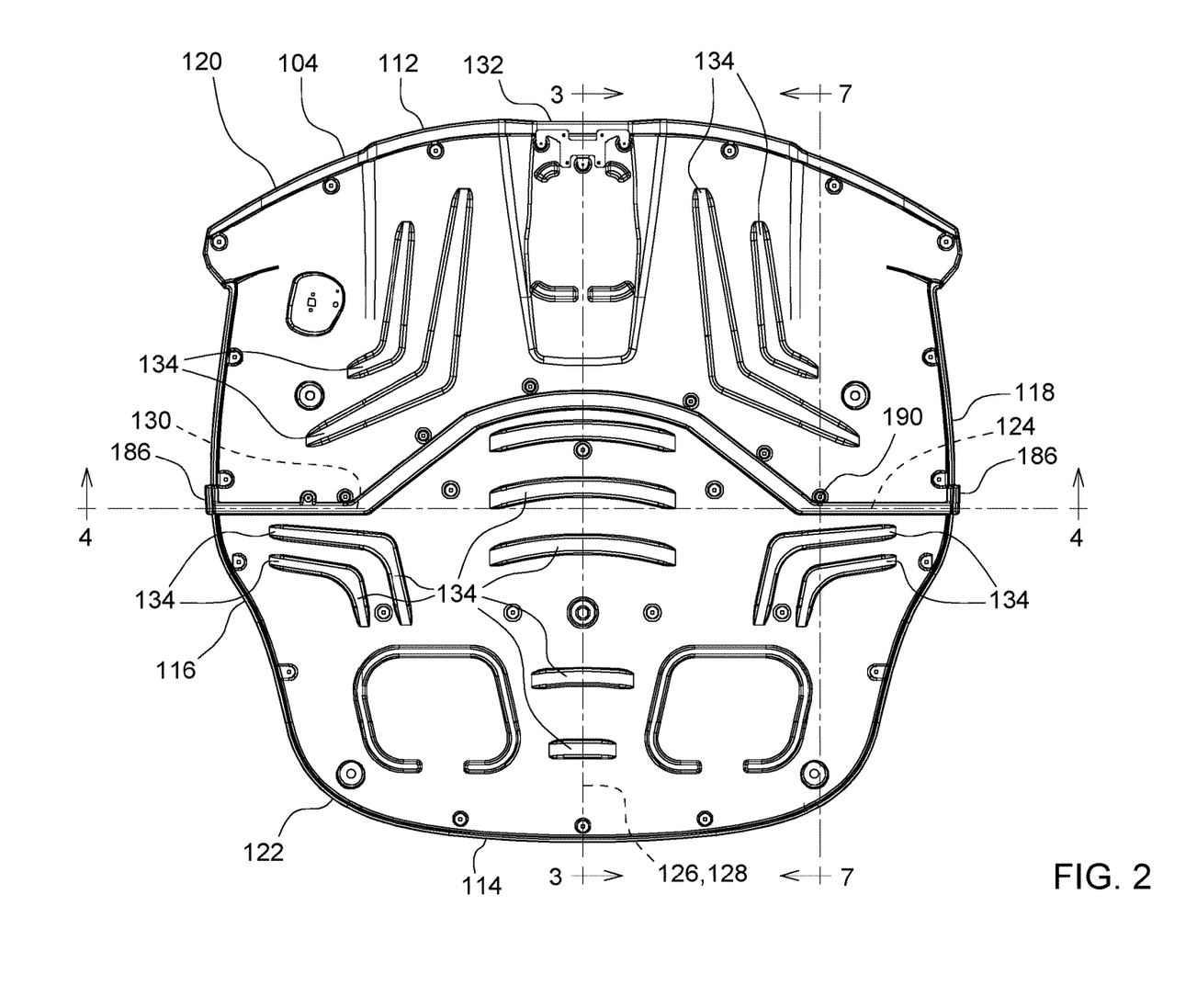
FIG. 2 is a top view of an example roof of the vehicle of FIG. 1.

FIG. 2 is a top view of the roof 104 of the work vehicle 100 shown in FIG. 1. The roof 104 includes a leading end 112, a trailing end 114, a first lateral side 116, and a second lateral side 118. The roof 104 is formed from a first roof panel 120 and a second roof panel 122 that are connected along an interface 124. The first roof panel 120 forms a leading roof panel in that the first roof panel 120 is located at a leading end of the roof 104, and the second roof panel 122 forms a trailing roof portion. In some implementations, the interface 124 defines a lap joint in which a portion of the first roof panel 120 and a portion of the second roof panel 122 overlap. In some implementations, one or both of the first roof panel 120 and the second roof panel 122 may be formed using a thermoforming process.

The roof 104 includes a curvature that defines a path 126 that extends across the roof 104 and defines a region of the roof 104 that, in a lateral direction, has the greatest elevation when the work vehicle 100 is conventionally positioned on level ground. In some implementations, the path 126 may extend in a generally longitudinal direction across the roof 104. Laterally, the roof 104 slopes away from the path 126 towards the lateral sides 116 and 118. The path 126 is reflected in each of the first and second roof panels 120 and 122. As a result of the path 126 and the overall shape of the roof 102, a liquid, such as water, introduced onto the roof 104 will flow laterally towards the lateral sides 116 and 118 when the work vehicle is positioned conventionally on level ground. In FIG. 2, the path 126 is illustrated as extending in a straight line longitudinally along a longitudinal centerline 128. However, in other implementations, the path 126 may follow other routes that extend generally longitudinally along the roof 104. In some implementations, the path 126 defines a ridge that extends generally longitudinally along the roof 104.

In the illustrated example, the interface 124 has a symmetrical shape about a longitudinal centerline 128 represented by the line representing the path 126. The longitudinal centerline 128 extends from the forward end 112 to the trailing end 114 of the roof 104. Moving away from the longitudinal centerline 128, the interface 124 curves towards the trailing end 114 and, at location 130, moves generally linearly towards the respective lateral sides 116 and 118. However, the illustrated path of the interface 124 is provided merely as an example. Thus, in other implementations, the interface 124 may take other routes. For example, in some instances, the route traced by the interface may omit a portion that is directed towards the trailing end 114. Still further, in some implementations, the interface 124 may be asymmetrical about the longitudinal centerline 128.

The roof 104 also includes other features, such as a sloped or recessed portion 132 formed at the leading end 112 of the roof 104. In the illustrated example, the recessed portion 132 provides a mounting surface for an antenna, such as a GNSS antenna. The roof 104 also includes raised portions 134. The raised portions 134 increase the rigidity of the roof 104. In other implementations, the raised portions 134 may be arranged differently. Further, in other implementations, the roof 104 may include additional or fewer raised portions 134.

Figure 3:
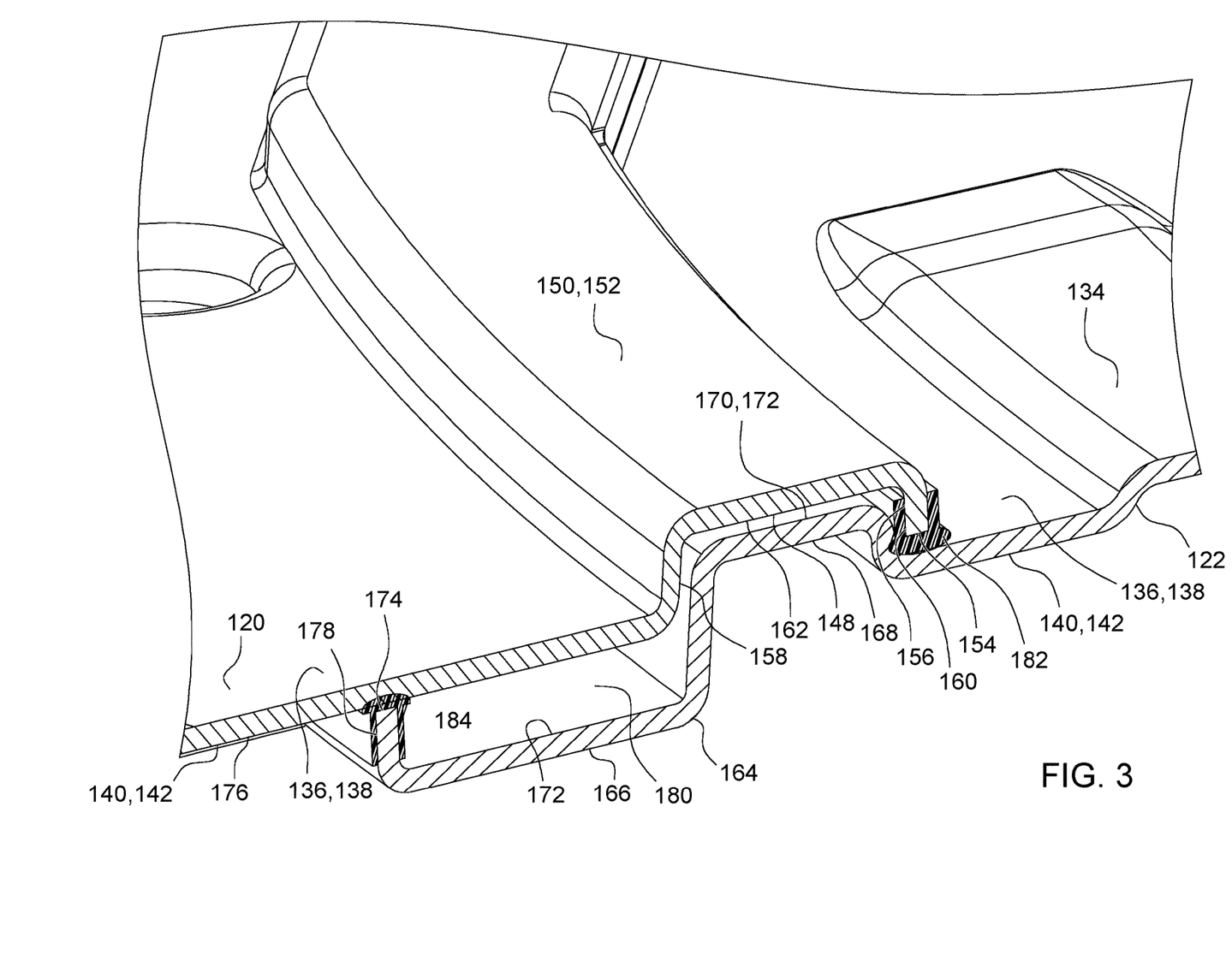
FIG. 3 is a detail cross-sectional view of the roof of FIG. 2 taken along line 3-3.
Figure 4:
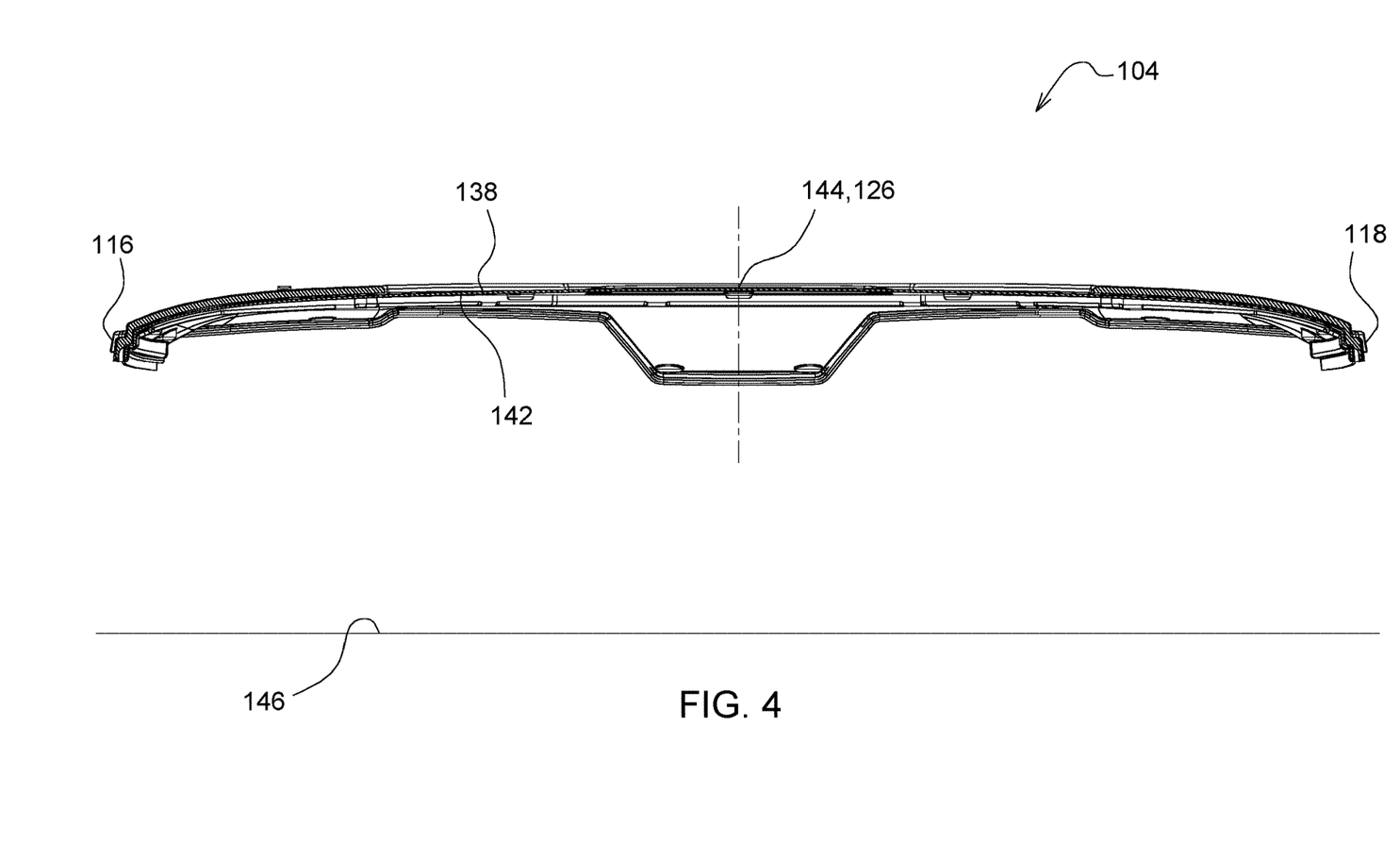
FIG. 4 is another cross-sectional view of the roof of FIG. 2 taken along line 4-4.

FIG. 3 is a detail cross-sectional view of the roof 104 taken along line 3-3. As shown, the first roof panel 120 and the second roof panel 122 define a reference surface 136. The reference surface 136 is an exterior surface of the roof 104, and, with vehicle 100 containing the roof 104 positioned conventionally on level ground, the references surface 136 forms a top surface 138 of the roof 104. The roof 104 also defines a second exterior surface 140, opposite the top surface 138, which, in the context of a vehicle positioned conventionally on level ground, defines a bottom surface 142. For the illustrated 104, the reference surface 136 generally is not a planar surface. That is, the reference surface 136 defines a curvature, including a curvature that causes the shape of the roof 104 to slope away from the longitudinal centerline 128 towards the first and second lateral sides 116 and 118. This curvature is illustrated by the cross-sectional view shown in FIG. 4, taken along line 4-4 shown in FIG. 2. As shown, the curvature of the roof 104 along a transverse cross-section defines a peak 144 along the path 126 curving outwardly towards the first and second lateral sides 116 and 118 and downwardly towards the ground 146. As explained, this curvature allows for drainage of liquid introduced onto the roof 104 towards the lateral sides 116 and 118. Further, as also explained, the roof 104 also curves from fore to aft, also promoting flow of liquid introduced onto the roof 104 towards the trailing end 114 and towards the leading end 112. As a consequence of these curvatures defined by the roof 104, liquid, such as water, pooling of a liquid introduced onto the roof 104 avoided, and, consequently, the liquid drains away, reducing the risk of intrusion of the liquid into the cab 102.

Further, a portion of the reference surface 136 is formed along each of the first roof panel 120 and the second roof panel 122 and is generally a continuous surface. Raised or recess portions, discussed below, are formed in the first and second roof panels 120 and 122 the defines surfaces that are offset from the reference surface 136. As also shown in FIG. 3, the reference surface 136 of the second roof panel 122 is interrupted by one of the raised portions 134.

As shown in FIG. 3, a trailing end portion 148 of the first roof panel 120 defines a first raised portion 150 that is offset from the reference surface 136. With the vehicle 100 conventionally positioned on level ground, the raised portion 150 defines a surface 152 that is offset from and positioned above the reference surface 136. The first raised portion 150 follows a shape defined by the trailing end portion 148. The trailing end portion 148 defines a trailing edge 154 that faces the reference surface 136 of the second roof panel 122. In the illustrated example shown in FIG. 3, the trailing edge 154 is formed on an end of a vertically arranged wall 156 of the trailing end portion 148. Other orientations, e.g., nonvertical orientations, of the wall 156 are also within the scope of the present disclosure. In some implementations, the wall 156 is formed at an end of the trailing end portion 148 and is disposed perpendicularly to the exterior surface 138 of the second roof panel 122. In other implementations, the wall 156 on which the trailing edge 154 is formed may have an arrangement relative to the exterior surface 138 that is other than perpendicular thereto. For example, in some implementations, the wall 156 of the trailing end portion 148 may be obliquely arranged relative to the reference surface 136, for example, to accommodate a draft angle of the first roof panel 120. Further, in some instances, the wall 156 may have a curved shape as opposed to a linear shape. In some implementations, the first raised portion 150 forms a first side 158, a second side 160 opposite the first side, and a third side 162 extending between the first side and the second side. Sizes of the first, second, and third sides 158, 160, and 162 of the first raised portion 150 can vary along the interface 124. Thus, the cross-sectional size of the first raised portion 150 can vary along the interface 124. In other implementations, the first raised portion 150 may have a constant cross-sectional size along the interface 124.

The second roof panel 122 includes a leading end portion 164. A recessed portion 166 is formed in the leading end portion 164 of the second roof panel 122. In some implementations, the recessed portion 166 follows a shape defined by the leading end portion 164. In the illustrated example, the leading end portion 164 defines a shape that is symmetrical about the longitudinal axis 128. In other implementations, the leading end portion 164 may define a nonsymmetrical shape. A second raised portion 168 is formed in the second roof panel 122 and is positioned adjacent to the recessed portion 166. Again, with the vehicle conventionally positioned on level ground, the second raised portion 168 defines a surface 170 that is offset from and positioned above the reference surface 136, and the recessed portion 166 defines a surface 172 that is offset from and positioned below the reference surface 136. Similar to the first raised portion 150, a cross-sectional size of the second raised portion 168 may vary along the interface 124. In some implementations, a cross-sectional size of the second raised portion 168 may have a constant cross-sectional size. A cross-sectional size of the recessed portion 166 may also vary along the interface 124. The leading end portion 164 defines a leading edge 174 that faces an exterior surface 176 formed on a side of the first roof panel 120 opposite the reference surface 136. In the illustrated example of FIG. 3, the leading end portion 164 includes a vertically arranged wall 178, and the leading edge 174 is formed at an end of the wall 178. Other orientations, e.g., nonvertical orientations, of the wall 178 are also within the scope of the present disclosure. In some implementations, the wall 178 is formed at an end of the leading end portion 164 and is disposed perpendicularly to the exterior surface 176 of the first roof panel 120. In some implementations, the wall 178 may be obliquely arranged relative to the exterior surface 176, for example, to accommodate a draft angle of the second roof panel 122. Further, in some instances, the wall 178 may have a curved shape as opposed to a linear shape.

As shown in FIG. 3, the trailing end portion 148 of the first roof panel 120 and the leading end portion 164 of the second roof panel 122 overlap each other at the interface 124 such that the second raised portion 168 of the second roof panel 122 is received into and nests within the first raised portion 150 of the first roof panel 120. As a result of this arrangement, a passageway 180 is formed by the recessed portion 166 of the leading end portion 164 of the second roof panel 122 and the first roof panel 120. Particularly, the passageway 180 is formed between a volume defined by the recessed portion 166 and the exterior surface 176 of the first roof panel 120. A cross-sectional size of the passageway 180 may vary along interface 124.

Figure 5:
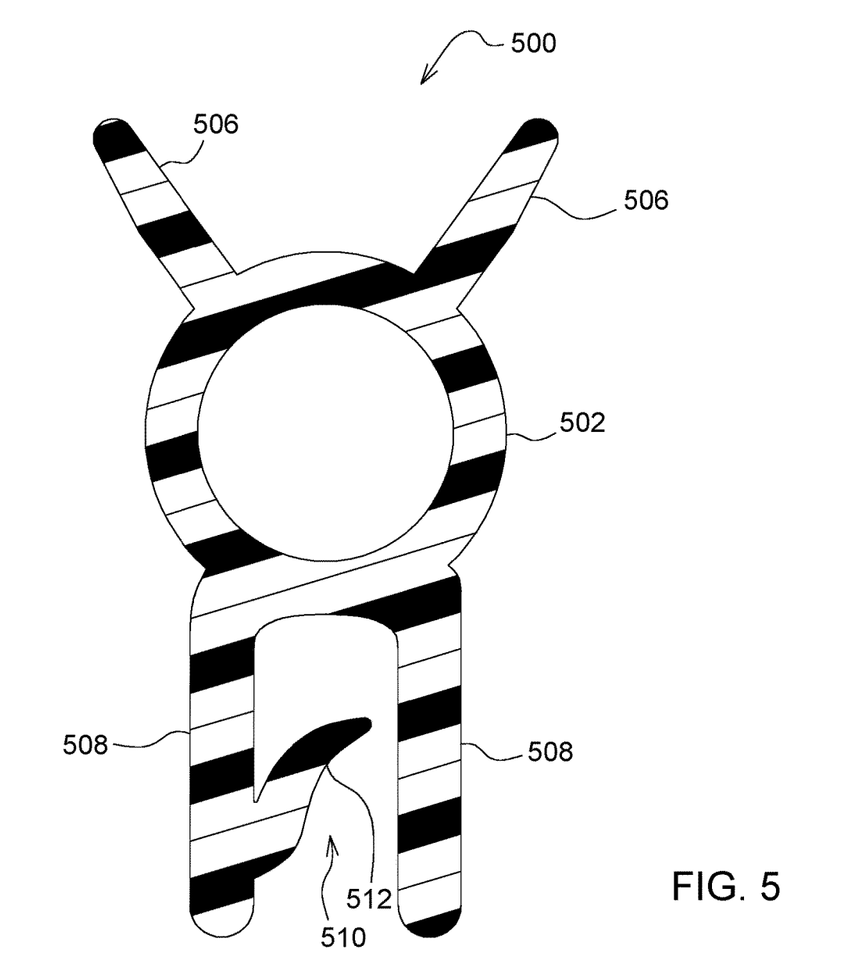
FIG. 5 is a cross-sectional view of an example bulb seal, according to some implementations of the present disclosure.

A first seal 182 is formed between the trailing edge 154 of the trailing end portion 148 and the reference surface 136 of the second roof panel 122, and a second seal 184 is formed between the leading edge 174 of the leading end portion 164 and the exterior surface 176 of the first roof panel 120. In some implementations, one or both of the first seal 182 and the second seal 184 are bulb seals. An example bulb seal is shown in FIG. 5. In other implementations, other types of seals can be used.

FIG. 5 is a cross-sectional view of an example bulb seal 500 that is within the scope of the present disclosure. As shown in FIG. 5, the bulb seal 500 includes a compressible portion 502 that has a circular cross-sectional shape and defines a passageway 504 therealong. A pair of protruding portions 506 extend from the compressible portion 502. In some implementations, the protruding portions 506 may extend radially outwardly from the compressible portion 502. The compressible portion 502 is compressed between the first and second roof panels 120 and 122 to form a seal that operates to prevent passage of a liquid, such as water. With the compressible portion 502 compressed between the first and second roof panels 120 and 122, the protruding portions 506 abut against an exterior surface of the first roof panel 120 or the second roof panel 122, as the case may be, to further enhance sealing performance of the bulb seal 500. The bulb seal 500 also includes legs 508 that define a slot 510. The slot 510 receives an edge of the first roof panel 120 or the second roof panel 122, such as an edge of leading edge 174 or the trailing edge 154. A protrusion 512 extends from one of the legs 508 into the slot 510. The protrusion 512 assists in securing the bulb seal 500 to first roof panel 120 or the second roof panel 122, such as by increasing a frictional force between the legs 508 of the bulb seal 500 and the respective roof panel. In some implementations, the legs 508 are parallel to each other. In other implementations, the legs 508 are nonparallel. In some implementations, the protrusion 512 is omitted.

In some implementations, the bulb seal 500 extends along an entirety of the trailing edge 154 of the trailing end portion 148 of the first roof panel 120 and the leading edge 174 of the leading end portion 164 of the second roof panel 122. The seals 182 and 184 are able to provide a seal between the first roof panel 120 and the second roof panel 122 along an entirety of the interface 124 between the first roof panel 120 and the second roof panel 122. For example, where one or both of the seals 182 and 184 are bulb seals, such as bulb seal 500, the seals 182 and 184 compress between the first and second roof panels 120 and 122 to form seals therebetween. The seals 182 and 184 are able to conform to variations in a gap formed between the trailing edge 154 and the second roof panel 122 and the leading edge 174 and the first roof panel 120 along the interface 124, thereby preventing or reducing the risk of water intrusion beyond the seals 182 and 184.

Figure 6:
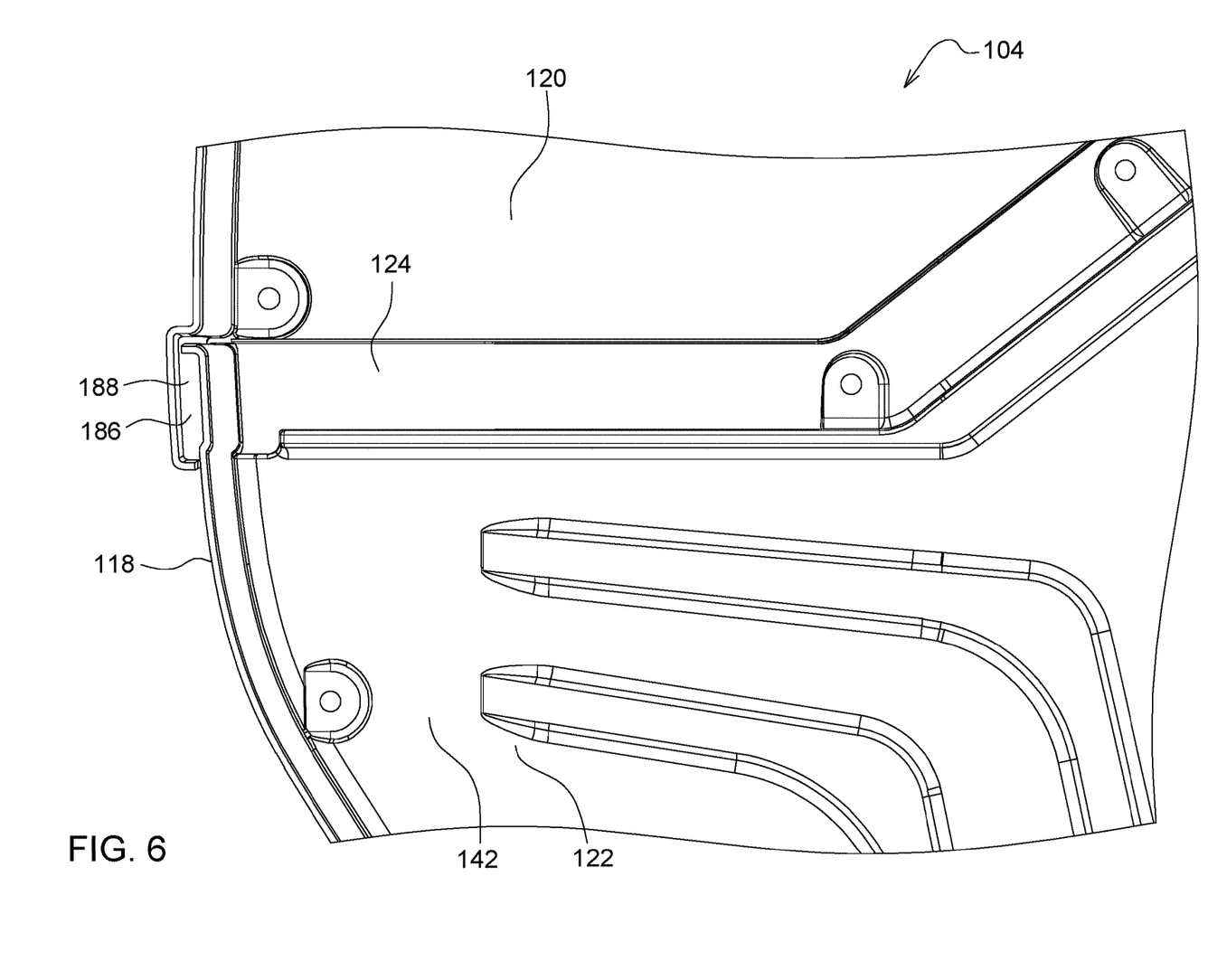
FIG. 6 is a detail view of a portion of a bottom surface of the roof of FIG. 2 showing an outlet of a passageway formed by the roof, according to some implementations of the present disclosure.

Outlets 186 are formed at opposing ends of the passageway 180 and are located at a position along the lateral sides 116 and 118 of the roof 104. The outlets 186 define openings 188 that are formed in the bottom surface 142 of the roof 104 and are directed downwards, as would be construed with the vehicle positioned conventionally on level ground. FIG. 6 is a detail view of the bottom surface 142 of the roof 104. The outlets 186 open downwards so that any liquid resident within the passageway 180 is able to flow easily and drain from the passageway 180, particularly due to the lateral curvature of the roof 104, described earlier.

Referring again to FIG. 3, the interconnection of the first roof panel 120 and the second roof panel 122, particularly the nesting of the second raised portion 168 and the first raised portion 150, the formation of the passageway 180 between the first roof panel 120 and the second roof panel 122, and the inclusion of the seals 182 and 184, provides for a reduction in liquid penetration through the interface 124 and intrusion of liquid into a cab 102 of the vehicle 100. For example, the curvature of the roof 104, both laterally and longitudinally, is a first aspect against intrusion by water introduced onto the top surface 138 of the roof 104. This curvature promotes runoff of the liquid (e.g., water) from the roof 104. A second aspect of the roof that resists water intrusion is the seals 182 and 184. The ability of the seals 182 and 184 to fill a gap that may exist between the trailing edge 154 and the exterior surface 138 and leading edge 174 and the exterior surface 176 provides a barrier to liquid intrusion into the interface 124. Should a liquid intrude beyond the first seal 182, the liquid must flow over the second raised portion 168 formed in the leading end portion 164 of the second roof panel 122. Should the liquid get beyond the first seal 182 and over the second raised portion 168, the liquid collects in the passageway 180. As a result of the curvature of the roof 140, particularly the lateral curvature, liquid collected in the passageway 180 is directed laterally towards the outlets 186. Further, because of the volume defined by passageway 180, the amount of liquid that can be handled by the passageway 180 before the captured liquid reaches the second seal 184 in combination with the outlets 186 of the passageway 180 eliminates or reduces the risk that liquid penetrates beyond the second seal 184 to intrude into the cab 102 of the vehicle 100. Thus, the interface 124 of the roof 104 reduces or eliminates the risk of liquid intrusion through roof 104 and into the cab 120 of the vehicle 100.

Figure 7:
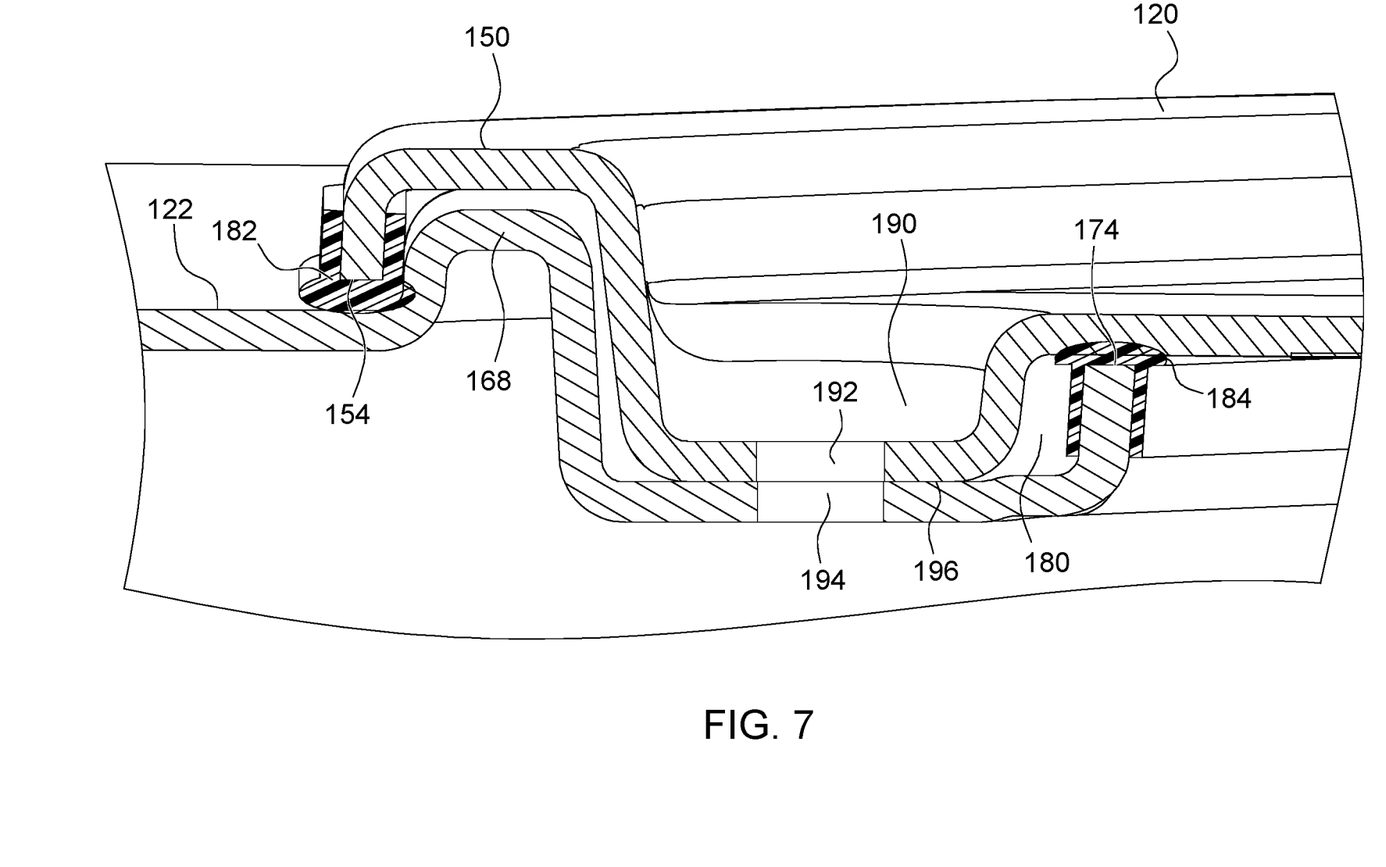
FIG. 7 is another cross-sectional view of the roof of FIG. 2 taken along line 7-7.

FIG. 7 is a detail view of a cross-section of the roof 104 taken along line 7-7 shown in FIG. 2. A series of recesses 190 are formed in the first roof panel 120 at locations along the passageway 180. The recesses 190 extend into the passageway 180. However, the recesses 190 do not occlude an entirety of the cross-section of the passageway 180. As a result, notwithstanding the presence of the recesses 190, any liquid residing in the passageway 180 is allowed to flow through the passageway 180, around the recesses 190, and to the outlets 186, thereby allowing liquid to pass through and out of the passageway 180. One of these recesses 190 is shown in FIG. 7. An aperture 192 is formed in each recess 190 and aligns with a corresponding aperture 194 formed in the second roof panel 122. A fastener or other securing component is received into the aligned apertures 192 and 194 to secure the first roof panel 120 and the second roof panel 122 together. The recess 190 defines an end portion 196, which may define an annular surface, that abuts the surface 172 of the second roof panel 122 along the passageway 180. A clamping load provided by the fasteners passing through the aligned apertures 192 and 194 clamps the end portion 196 to the surface 172 of the second roof panel 122 to secure the first roof panel 120 to the second roof panel 122. Thus, this clamping force avoids the intrusion of liquid from the passageway 180 through the aligned apertures 192 and 194.

Without in any way limiting the scope, interpretation, or application of the claims appearing below, a technical effect of one or more of the example implementations disclosed herein is a roof of a vehicle that includes an interface that avoids or reduces the risk of liquid intrusion through the roof and into an interior of a cab of the vehicle.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A roof for an agricultural vehicle, the roof comprising:
   a first roof panel forming a leading roof portion, wherein the first roof panel comprises a first raised portion formed at a trailing end portion of the first roof panel; and a second roof panel forming a trailing roof portion and connected to the first roof panel at an interface, wherein the second roof panel comprises:
   a first recess formed at a leading end portion of the second roof panel, and
   a second raised portion formed adjacent to the first recess,
   wherein the trailing end portion of the first roof panel overlaps the leading end portion of the second roof panel such that the second raised portion of the second roof panel nests within the first raised portion formed in the first roof panel;
the first roof panel and the second roof panel defining a path extending generally longitudinally along the first roof panel and the second roof panel with the first roof panel and the second roof panel sloping away from the path towards a first lateral side and a second lateral side of the roof, the interface defining a passageway extending laterally between the first lateral side and the lateral second side.

2. The roof of claim 1, wherein the passageway comprises an outlet disposed at a position along at least one of the first lateral side and the second lateral side.

3. The roof of claim 1, wherein the interface comprises a lap joint.

4. A roof for a vehicle, the roof comprising:
a first roof panel forming a leading roof portion; and
a second roof panel forming a trailing roof portion and connected to the first roof panel at an interface, the first roof panel and the second roof panel defining a path extending generally longitudinally along the first roof panel and the second roof panel with the first roof panel and the second roof panel sloping away from the path towards a first lateral side and a second lateral side of the roof, the interface defining a passageway extending laterally between the first lateral side and the lateral second side, wherein a cross-sectional size of the passageway varies along the interface.

5. The roof of claim 1, wherein the first raised portion, the second raised portion, and the first recess extend along an entirety of the interface.

6. The roof of claim 1, wherein the first roof panel comprises an exterior surface adjacent to the second roof panel, and wherein the passageway is defined between the first recess of the second roof panel and a portion of the exterior surface of the first roof panel adjacent to the first recess.

7. The roof of claim 1, wherein a cross-sectional size of the passageway varies along the interface.

8. The roof of claim 1, wherein the leading end portion of the second roof panel comprises a leading edge and wherein a seal is formed along the leading edge between the leading edge and an exterior surface of the first roof panel adjacent to the second roof panel.

9. The roof of claim 8, wherein the seal comprises a bulb seal.

10. The roof of claim 1, wherein the trailing end portion of the first roof panel comprises a trailing edge and wherein a seal is formed along the trailing edge between the trailing edge and an exterior surface of the second roof panel adjacent to the first roof panel.

11. The roof of claim 10, wherein the seal comprises a bulb seal.

12. The roof of claim 1, wherein a wall formed at an end of the leading end portion of the second roof panel extends approximately perpendicularly to an exterior surface of the first roof panel.

13. The roof of claim 1, wherein a wall formed at an end of the trailing end portion of the first roof panel extends perpendicularly to an exterior surface of the second roof panel.

14. An agricultural machine comprising:
a cab that includes a roof comprising:
   a first roof panel forming a leading roof portion, wherein the first roof panel comprises a first raised portion formed at a trailing end portion of the first roof panel; and
a second roof panel forming a trailing roof portion and connected to the first roof panel at an interface, wherein the second roof panel comprises:
   a first recess formed at a leading end portion of the second roof panel, and
   a second raised portion formed adjacent to the first recess,
   wherein the trailing end portion of the first roof panel overlaps the leading end of the second roof panel such that the second raised portion of the second roof panel nests within the first raised portion formed in the first roof panel;
the first roof panel and the second roof panel defining a path extending generally longitudinally along the first roof panel and the second roof panel with the first roof panel and the second roof panel sloping away from the path towards a first lateral side and a second lateral side of the roof, the interface defining a passageway extending laterally between the first lateral side and the lateral second side.

15. The agricultural machine of claim 14, wherein the passageway comprises an outlet disposed at a position along the first lateral side or the second lateral side.

16. The agricultural machine of claim 14, wherein the first roof panel comprises an exterior surface adjacent to the second roof panel, and wherein the passageway is defined between the first recess of the second roof panel and a portion of the exterior surface of the first roof panel adjacent to the first recess.

17. The agricultural machine of claim 14, wherein the leading end portion of the second roof panel comprises a leading edge and wherein a seal is formed along the leading edge between the leading edge and an exterior surface of the first roof panel adjacent to the second roof panel.

18. The agricultural machine of claim 14, wherein the trailing end portion of the first roof panel comprises a trailing edge and wherein a seal is formed along the trailing edge between the trailing edge and an exterior surface of the second roof panel adjacent to the first roof panel.

19. The agricultural machine of claim 14, wherein the roof further comprises:
a first outlet is formed at the first lateral side; and
a second outlet formed at the second lateral side, and
wherein the passageway extends from the first outlet to the second outlet.

20. The roof of claim 4, wherein the first roof panel comprises a first raised portion formed at a trailing end portion of the first roof panel,
wherein the second roof panel comprises
   a second raised portion, and
   wherein the trailing end portion of the first roof panel overlaps the leading end portion of the second roof panel such that the second raised portion of the second roof panel nests within the first raised portion formed in the first roof panel.

* * * * *